Figure 1:
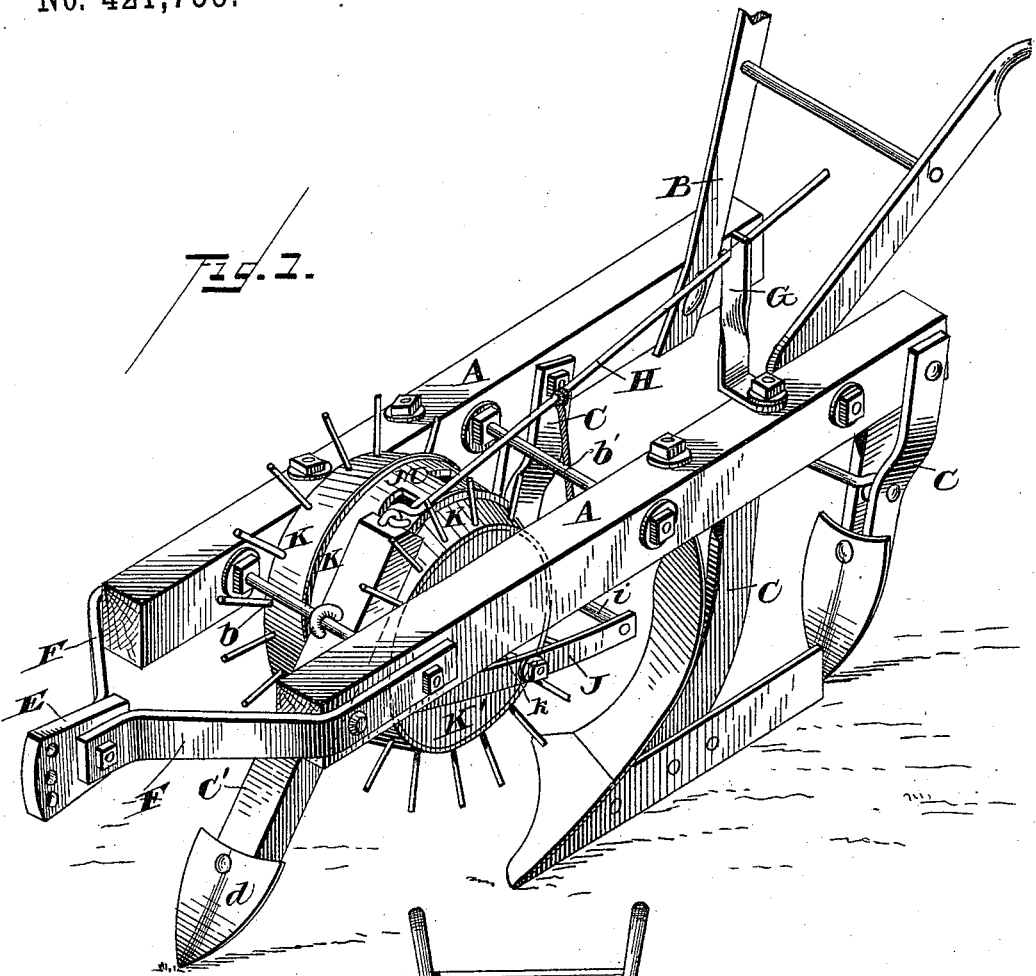

(No Model.) 2 Sheets—Sheet 1.

J. W. PEELER.
CORN OR COTTON SEED PLANTER.

No. 421,755. Patented Feb. 18, 1890.

WITNESSES:
F. L. Ourand
W. A. Acker

INVENTOR:
John W. Peeler
by J. Sams Daggett & Co.
Attorneys (No Model.) 2 Sheets—Sheet 2.
J. W. PEELER.
CORN OR COTTON SEED PLANTER.
No. 421,755. Patented Feb. 18, 1890.
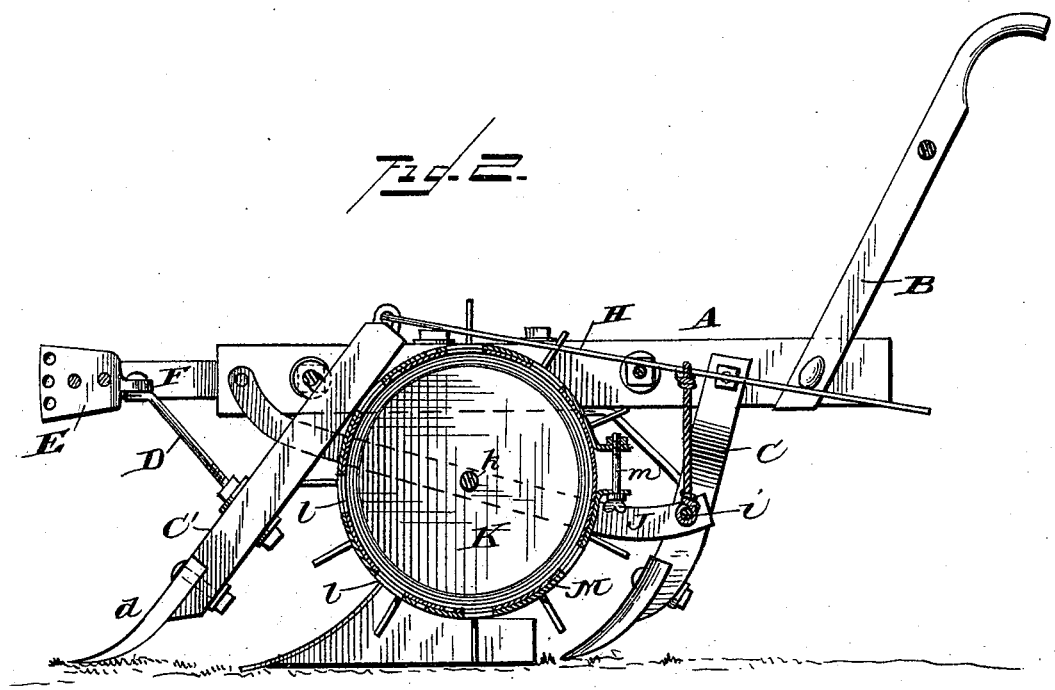
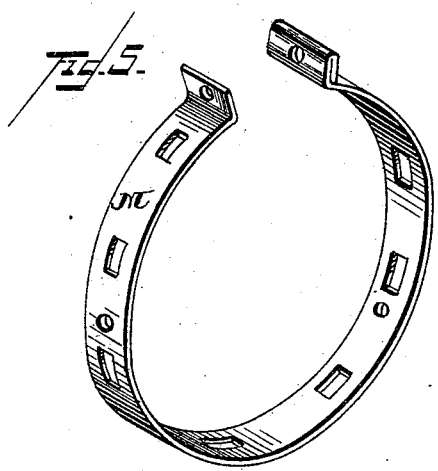
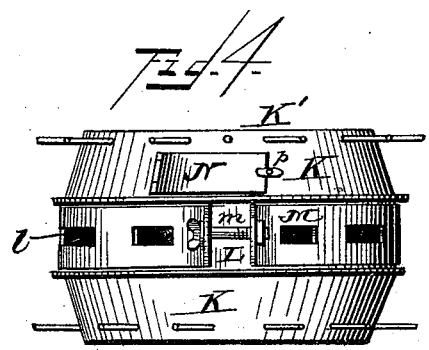
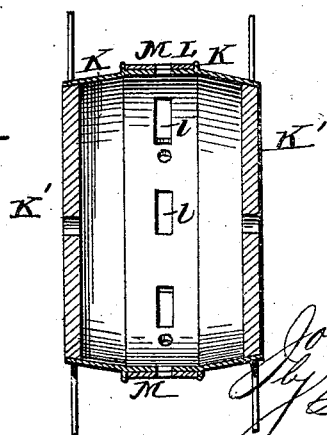
WITNESSES:
F. L. Ourand
N. A. Acker
INVENTOR:
John W. Peeler
by Sours Daggett
Attorneys

UNITED STATES PATENT OFFICE.

JOHN WILIAM PEELER, OF CALVERT, TEXAS.

CORN OR COTTON-SEED PLANTER.

SPECIFICATION forming part of Letters Patent No. 421,755, dated February 18, 1890.

Application filed August 27, 1889. Serial No. 322,138. (No model.)

*To all whom it may concern:*

Be it known that I, JOHN WILIAM PEELER, a citizen of the United States, and a resident of Calvert, in the county of Robertson and State of Texas, have invented certain new and useful Improvements in Corn or Cotton-Seed Planters; and I do hereby declare that the following is a full, clear, and exact description of the invention, which will enable others skilled in the art to which it appertains to make and use the same.

My invention has relation to certain new and useful improvements in corn and cotton-seed planters; and it consists of the parts and details of construction, as hereinafter more fully pointed out in the drawings and described in the specification.

The general object of my invention consists in providing a combined plow and interchangeable revolving seed-dropper so constructed as to permit of its being readily converted into a corn or cotton-seed planter with the least trouble.

Figure 3:
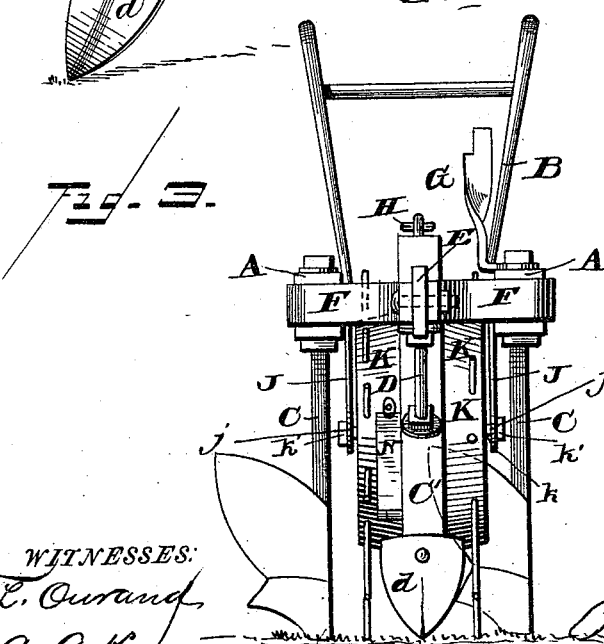

Referring to the drawings forming a part of this application, Figure 1 is a perspective view of the entire device, showing the dropper raised from contact with the ground. Fig. 2 is a longitudinal sectional view showing the dropper in its normal position; Fig. 3, a front view of the device; Fig. 4, a detail view of the corn and seed dropper; Fig. 5, a detail view of the perforated sliding encircling band removed from the dropper; and Fig. 6 is a cross-sectional view through the cotton-seed dropper.

Similar letters of reference are used to denote corresponding parts throughout the entire specification and several views of the drawings.

The letter A represents the side beams of the plow, said beams being secured together by means of the screw-threaded adjustable cross-rods $b\ b'$. To the rear of the plow-beams are secured the lower ends of the ordinary handle B. Attached in any suitable manner to the bottom of the plow-beams are the plow-standards C C, to which are secured the usual plow-points. The forward standards have secured thereto the ordinary mold-board and landside, thus forming turning-plows, while the rear ones form the follower or coverer-plow. Secured to the cross-rod $b$ at the center thereof is the inclined downwardly-extending plow-standard C', which has secured at its lower end the plow-point $d$, which is used as the furrow-plow. This standard is retained in its inclined adjusted position by means of the metallic rod D, which rod has its upper end fastened to the rear end of the plow-clevis E. Said clevis is adjustably secured between the ends of the hound or iron straps F F, which are secured to the forward end of the plow-beams by means of adjustable rods or bolts. Mounted upon one of said beams near the rear thereof is the upper angular projection G, which projection is turned so as to have one of its side faces inward, and said inner side is slightly cut away at its top, so as to form a seat for the end of the rearwardly-extending rod H. This rod is pivotally secured at its forward end to the top of the plow-standard C', and is used for the purpose hereinafter described.

The letter J represents the rearward downwardly-extending curved arms adjustably secured to the forward inner face of the plow-beams. The lower ends of said arms are secured together by means of the cross-rod $i$. These arms are provided near the center thereof with apertures $j\ j$, through which the outer ends of the screw-threaded axle $k$ pass.

K indicates my improved corn and cotton-seed dropper removably secured between the arms J by means of the axle $k$, which passes through the center thereof. The outer ends of said axle, as before stated, are made screw-threaded, so as to enable the same to receive the nuts $k'\ k'$. The dropper consists of the side pieces K' K', which may be made of wood or iron, (preferably of wood,) and of the metallic covering L. The covering is provided around the center with a series of openings $l\ l$, said openings being both rectangular and circular. The rectangular openings are designed for outlet for the cotton-seed, while the circular ones are for the dropping of corn. Surrounding the dropper is a metallic band or collar M, which has a series of perforations centrally therearound to correspond with those in the covering. The perforations in the collar are so situated that when the rectangular ones are registering with the rectangular ones in the cover the circular ones will be closed, and so when the circular ones are opened the rectangular ones will be closed. Said collar is broken at its center, and one of the ends is provided with the upward flange and is perforated, while the other end is flanged upward and then downward, so as to form a double flange, which double flange has a screw-threaded opening therein, so as to receive the thumb-screw m, by means of which the band or collar may be tightened or loosened upon the metallic covering of the seed-receptacle or dropper, and which at the same time permits of the sliding of the collar in order to open or close the openings. The collar M passes centrally around the cover L, and said cover is gradually inclined away from the edge of the collar, thus causing the cover to be raised or bulged at its center. By thus inclining the cover the bottom of the seed-receptacle will also be inclined from the outer edges toward the center, and thus permit of the more ready sliding of the grain contained therein. In order that access may be had to the receptacle or dropper for insertion of grain, I provide the swinging door N, which is hinged to the covering, and also secure below the edge of the door, the slide-catch p, by means of which the door may be securely fastened, so as to prevent swinging open when the dropper is revolved. The outer periphery of the dropper is provided with or has projecting therefrom a series of radial arms sufficient in length so as to come when the dropper is in its normal position, as shown in Fig. 2, in contact with the ground. The object of the arms is to keep the dropper such a height from the ground as to prevent the clogging of the apertures in the dropper-cover with dirt and at the same time to serve the function of causing the dropper to revolve with the forward movement of the plow. The dropper or seed-receptacle is so situated within the rearwardly-extending arms as to bring the central opening formed therein directly over the furrow made by the central or front furrow-plow.

It is obvious that as the dropper continually revolves with the forward movement of the plow the seed contained within the receptacle will, of necessity, pass through the openings formed in the cover into the central furrow, and that the same will afterward be covered by the turning-plows located to the rear of the dropper. The central openings of the dropper are made sufficiently far apart as to cause the dropping of the grain at a uniform distance apart. In view of the fact that the planting of corn requires a greater distance to be maintained between the grains than that of cotton-planting, I provide a smaller number of circular or corn openings than the rectangular or cotton openings. When it is desired that the dropper shall be applied for cotton-seed planting, the collar is turned so as to cover the circular opening on the cover and to allow the rectangular openings of the band to register with those formed in the cover, and when used for corn-planting the rectangular openings are closed by sliding around the collar and the circular ones are opened. In order to provide for the waste of grain while carrying the device from place to place, which would result if the dropper be allowed to revolve, I run a short chain or cord from the cross-rod i, which connects the rearwardly-extending arms with the rearwardly-extending rod H, so that the raising of said rod will cause the uplifting of the cross-rod i, arms J, and of the dropper secured between said arms to such a height that the radial arms P shall be free from contact with the ground. By placing the end of the rearwardly-extending rod within the cut-away portion of the angular projection G the dropper is held from coming in contact with the ground for any length of time.

It is obvious that inasmuch as there can be no revolution of the dropper unless in contact with the ground—that is, the radial arm—waste of seed is effectually guarded against. The lower or rear end of the rearwardly-extending rod is intended to be within reach of the driver, so that the same may be quickly and easily raised or lowered, as the case may be.

I am aware that many minor changes may be made in the construction herein set forth without departing from the nature and scope of my invention.

Having thus fully described my invention, what I claim as new, and desire to secure protection in by Letters Patent of the United States, is—

1. In a corn or cotton planter, the combination, with the side beams, of a front cross-rod, an inclined front standard provided with a staple through which said cross-rod passes, and also having secured to its lower end the furrow-point or plow, an inclined rod having its forward end secured to the plow-clevis and having its lower screw-threaded end passing through the plow-standard, and nuts arranged upon the screw-threaded ends of the inclined rod, upon each side of the standard, whereby the latter may be set at different inclinations.

2. In a corn or cotton planter, the combination, with the frame thereof, of the adjustable rearwardly-extending arms, cross-rod for securing said arms together, dropper secured between said arms, screw-threaded axle passing through the dropper and perforations in the rearwardly-extending arms, rearwardly-extending rod, chain connecting said rod with the cross-rod securing the arms together, so that the raising of the former will lift said arms and dropper, and of the angular projection secured to the rear of the plow-beam, having its upper portion cut away so as to form a seat for the end of the rearwardly-extending arm when lifted up, substantially as set forth.

In testimony that I claim the foregoing as my own I have hereunto affixed my signature in presence of two witnesses.

JOHN WILIAM PEELER.

Witnesses:
 M. L. COLLAT,
 R. A. RISSER.